Aug. 26, 1958 W. H. RIEDEL ET AL 2,848,880
DAIRY BOX
Filed Jan. 17, 1955 2 Sheets-Sheet 1

INVENTOR.
WALTER H. RIEDEL
BY WILLIAM G. RIEDEL
ATTORNEY

INVENTOR.
WALTER H. RIEDEL
WILLIAM C. RIEDEL
BY
ATTORNEY

United States Patent Office 2,848,880
Patented Aug. 26, 1958

2,848,880

DAIRY BOX

Walter H. Riedel and William C. Riedel, St. Paul, Minn.; Marie A. Riedel and First Trust Company of St. Paul, executors of said Walter H. Riedel, deceased Application January 17, 1955, Serial No. 482,277

3 Claims. (Cl. 62—263)

Our invention relates to a dairy box wherein dairy products may be stored in a convenient manner for the consumer. This dairy box is of a simple inexpensive construction and permits the storage of a quantity of milk and cream bottles as well as other dairy products keeping said dairy products cool enough to keep them fresh and in good condition for some time.

The consumer can have our dairy box placed in a convenient location so that the milkman who normally delivers one or more bottles of milk at a time to a family may place twelve ordinary quart-size milk bottles on each shelf of the dairy box, thus giving the consumer a supply which will last for a comparatively long time thereby enabling the dairy to give the consumer the quantity or wholesale price owing to the reduced cost of delivery of said dairy products.

Where it is necessary for the milkman to call daily upon the customer, or even every other day, to deliver one or more bottles of milk or cream unless the quantity is more than two or three bottles the delivery cost is expensive and the dairy must charge the consumer a sufficient price to absorb the delivery costs.

It will also be apparent that our dairy box will materially reduce the frequency of delivery by the dairy so that it can give the consumer the benefit of approximately the wholesale price of the dairy products based on quantity purchases on each delivery. Thus, our dairy storage unit will pay for itself in savings in the cost of the milk to the consumer. Further, the consumer will always have a supply of dairy products on hand and the dairy products will stay fresh for an extended period of time.

It has been noted that some consumers of dairy products will visit their cash and carry stores and purchase a larger supply of milk and other dairy products than they really have storage space for, because they want to obtain the saving in cost or the family is of some size and more milk and dairy products are used. It is with this in mind that we have designed our simple dairy box to provide a convenient storage strictly for dairy products and which dairy box can be located in a small space either within the home or on the outside of the same where it is convenient for the milkman to service the dairy box whenever he calls on the customer.

It is a feature of our dairy box to provide a self-contained cooling unit of a suitable nature for maintaining the temperature within the box most adaptable to keep the dairy products fresh. Each dairy box is equipped with the customer's record card on the inside of one of the doors of the same, and by means of a lock the dairy box can be made accessible only to the driver from the dairy and the housewife.

We have designed our dairy box so that it will handle the customer's milk supply as well as other dairy products for a week or more and will keep the products therein fresh and sanitary. This dairy storage box is not designed to act as a refrigerator in any manner whatsoever but as a means of serving a customer in the most direct manner, and giving the customer the benefit of much lower prices, in addition to providing for the storage of a supply of dairy products which is always accessible to the customer.

A further feature resides in providing a dairy storage box which is supported on the wall rather than on the floor. This permits the dairy box to be positioned at a convenient elevation for the dairyman who delivers the product and for the housewife.

It is a further feature to provide a dairy storage box which is fastened to the wall and supported by any form of suitable bracket and secured by screws or other means for locking the dairy storage box in place on the bracket so that it cannot be removed without the permission of the company supplying the dairy products or the customer.

It is a feature to provide a dairy storage box wherein space is formed within the same for the cooling mechanism and the radiator therefor together with air passageways adapted to receive fresh air in over the cooling unit and up past the radiator and out through a series of air holes formed in the bracket which supports the dairy box. It should be borne in mind that the dairy storage box be very compact, light in weight (possibly made out of aluminum) or any other lightweight material suitable therefor and should carry a serial number within the same for the protection of the company supplying the dairy products as well as the customer.

The record card forms an important part of the dairy box and is filled out by the milkman when he delivers the milk or dairy products so as to accurately advise the housewife at any time by referring to the card. This record card may be in any form and may be made out in duplicate or with any number of carbon copies so that the dairy supplying the products will also be advised from time to time. The drawings only illustrate the card record diagrammatically and it may be understood that the same may be varied and that further pockets (not shown) may be attached to the doors of our dairy storage box which pockets may carry milk tickets, money for certain dairy products or other tokens as may be approved by the company supplying the dairy products and the dairy storage box.

The objects and some of the details have been heretofore defined and others will be more clearly set forth in the following specification and claims.

In the drawings forming part of this specification:

It will be apparent that the foregoing drawings illustrate the dairy storage box in a more or less diagrammatic manner. The details of the cooling unit as well as the over-all construction of the dairy box are shown diagrammatically to illustrate a manner in which this invention may be carried out for the convenience of the consumer as well as the company supplying the dairy products.

The dairy storage box A may be made of lightweight material such as aluminum and is provided with any suitable form of insulation 10 between the walls to insulate the storage chamber 11. The wire shelf 12 may be provided within the dairy box on which bottles of milk may be stored.

Figure 1:
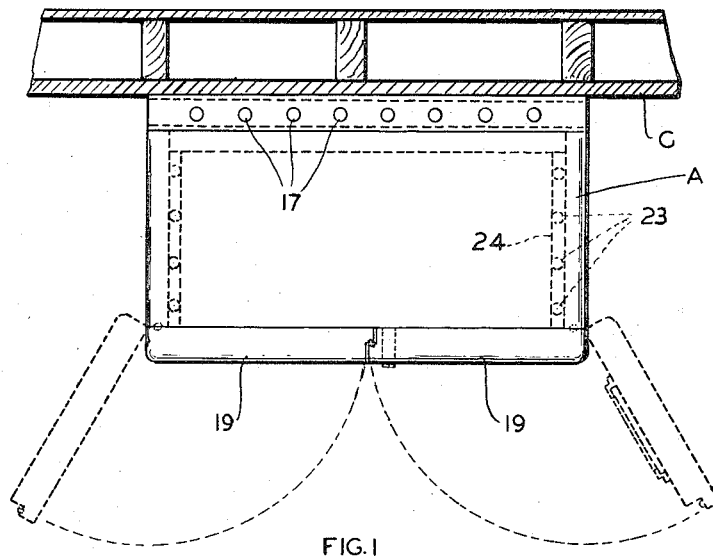
Figure 1 is a plan view showing the dairy box attached to a wall.
Figure 2:
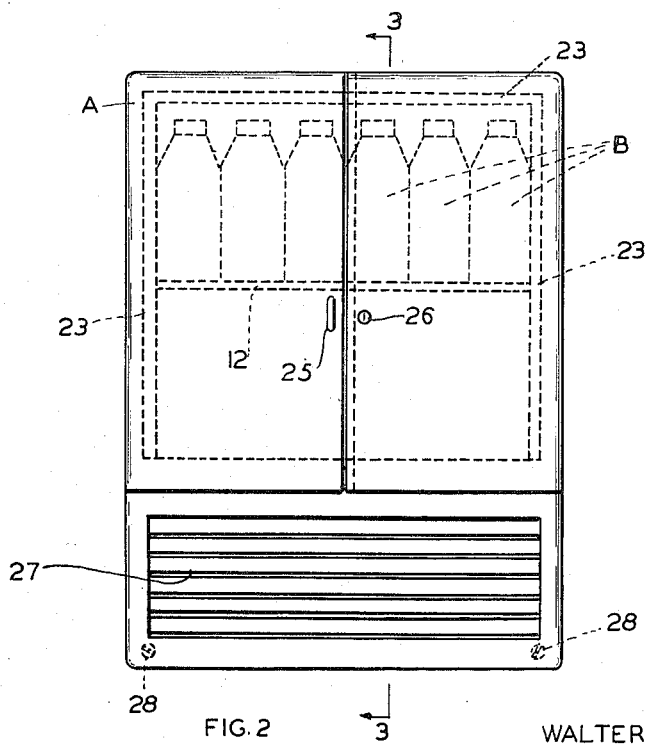
Figure 2 is a front elevation of the dairy box.
Figure 4:
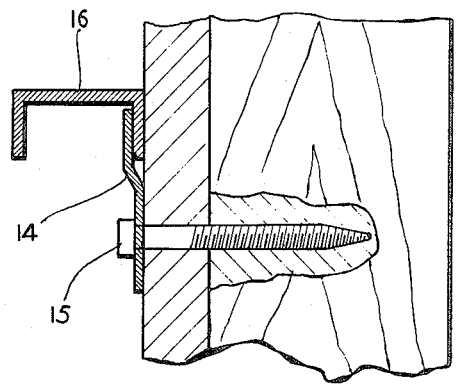
Figure 4 is an enlarged sectional detail of the dairy box supporting bracket.
Figure 3:
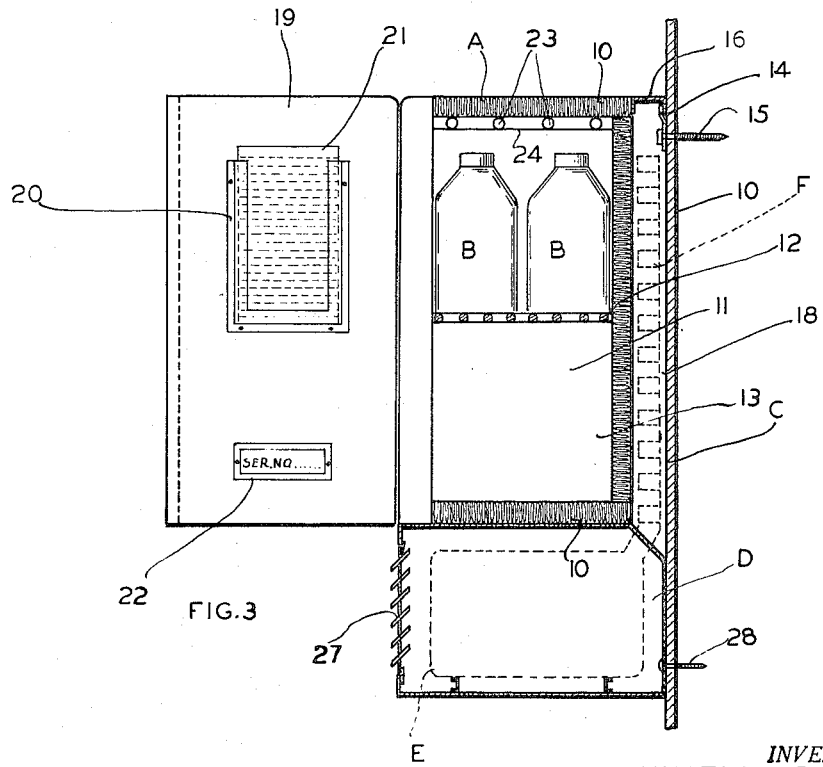
Figure 3 is a section on the line 3—3 of Figure 2.

The storage compartment within the chamber 11 may be divided by suitable shelf means 12 with any number of connecting compartments. In the drawings Figure 3 illustrates a low storage compartment 13 below the shelf 12. The dairy box A is designed to be of a narrow construction so as not to project too far out from the wall on which it is supported.

A suitable bracket 14 held by the lag screws 15 is adapted to form a hook on which one leg of the channel bar 16 engages. The channel bar 16 is adapted to be secured to the back of the storage box A in any suitable manner not shown. The channel bar also acts to hold the storage box A spaced away from the wall C on which it hangs and a series of air openings 17 are formed through the channel bar 16 to permit air to pass through the pasasge 18 at the back of the storage box A.

The dairy storage box is adapted to provide a unit means for storing dairy products therein and may be provided with one or more doors 19 which give access to the storage compartments within the box.

It is desirable to provide a card holder 20 attached to the inside of the door 19 of the box which is adapted to removably receive a record card 21 which may be in any form and which is adapted to carry the consumer's or housewife's name as well as the dairy company supplying such products. The card 21 may act as a record for the company as well as the consumer or housewife, and such card may be in any suitable form wherein carbon copies are made thereof.

The card records 21 may be used by the companies supplying the dairy products for billing the customer for the products supplied and stored in the box A.

A suitable serial number plate 22 may also be attached to the door or inside of the box A for the record of the dairy company as well as the customer. A further pocket (not shown in the drawings) may be attached to one of the doors 19 of the box A which may be adapted to receive milk tickets, coupons or other suitable articles for the convenience of the consumer and the dairy company.

The cooling coils 23 for the cooler unit are shown diagrammatically and may extend up the sides of the inner plate 24 and over the top of the inner plate of the cooler unit A. These cooling coils 23 may be of the character such as are commonly used where the same are formed inside of the inner wall 24 and directly connected to the wall so as to transmit the cooling medium to at least the side and top walls 24 of the cooler unit A. The cooling coils of the dairy box A are not for the purpose of lowering the temperature within the chamber 11 but merely for the purpose of maintaining the temperature low enough to keep the dairy products within the dairy box for a long period of time without spoiling.

It should be borne in mind that our dairy box is not a refrigerator nor is it designed to be used as a refrigerator in any sense whatsoever. Furthermore, our dairy storage box is of a compact, simple construction, light in weight being preferably made of aluminum or similar lightweight material. The dairy box is provided with a suitable handle 25 and a lock 26 which are shown diagrammatically thus making it convenient for the housewife to open.

The dairy box A is provided with a lower compartment D which has a louver door 27 which permits air to be drawn into the compartment D and passed up through the passageway 18. The compartment D is provided for the cooling unit E such as the motor and compressor, while the passageway 18 provides a space for the radiator F of the unit.

The luver door 27 my be locked closed so that the refrigerating unit cannot be tampered with by anyone but rather is taken care of by the service of the dairy company supplying the dairy products for the dairy box A. Suitable screws or members 28 are provided within the compartment C which attach the lower end of the dairy box to the wall C against removal from the bracket 14.

The utility of our dairy box will be apparent from the foregoing objects and description and is designed for the purpose of providing for the user of the dairy products a means of maintaining a supply in said compartments readily accessible. The dairy box also provides a means for the dairy company to reduce the cost of delivering by supplying such dairy products to its customers in quantities rather than small amounts. This enables the dairy company to give the customer a better price on said products.

We claim:

1. A dairy storage box including a storage compartment for dairy products, insulated walls for said storage compartment, shelf means within said storage compartment, bracket means for supporting said storage box, supporting means attached to said storage box to engage said bracket means to support said storage box, said supporting means having air exhaust openings formed therein, an air duct behind the back wall of said storage compartment, radiator means within said air duct, access doors for said storage compartment, record card holding means attached to the inner surface of said access doors, record card means insertable in said card holding means adapted to receive indicia, serial number means on an inner wall of said storage box, cooling coils on the side and top walls of said storage compartment, closure means on said access doors, locking means for said access doors, a cooling unit for said storage box, a second compartment for enclosing said cooling unit, a louvered door for said second compartment to permit the passage of air over said cooling unit around said radiator and through the openings in said supporting means, locking means for said louvered door and means within said second compartment for removably attaching said storage box to a wall.

2. A dairy storage box of light-weight material including a storage compartment for dairy products, insulated walls for said storage compartment, adjustable shelf means within said storage compartment, bracket means for supporting said storage box upon a wall, channel bar means attached to the top and end wall of said storage box to engage said bracket means to support said storage box, said channel bar means having a plurality of air exhaust openings formed therein, an air conduit behind the back wall of said storage compartment, radiator means within said air conduit, access doors for said storage compartment, record card holding means attached to the inner surface of said access doors, record card means insertable in said card holding means adapted to receive indicia to maintain a continuous inventory of the contents of said storage compartment, serial number means attached to an inner wall of said storage compartment, cooling coils attached to the side and top walls of said storage compartment, closure means affixed to said access doors, locking means for said access doors, a cooling unit for said storage box, a second compartment for enclosing said cooling unit, a louvered door for said second compartment to permit the passage of air over said cooling unit around said radiator and exhausted through the openings in said channel bar means, locking means for said louvered door and means within said second compartment for removably attaching said storage box to a wall.

3. A depository for perishables comprising a storage compartment having insulated end, side and back walls, an insulated closure member swingably attached to the front of said storage compartment, means affixed to said closure member to maintain said closure member in a locked position, adjustable shelving attached to the back and side walls within said storage compartment, removable recording means positioned within said storage compartment, a cooling unit housing having side, end and back walls attached beneath said storage compartment, a removable louvered front wall for said cooling unit housing, locking means affixed to said louvered front wall, a cooling unit for said storage compartment positioned within said cooling unit housing, an air duct coextensive with the back wall of said storage compartment and adjacent thereto communicable with said cooling unit housing, and means for fixedly supporting said depository on a vertical surface.

References Cited in the file of this patent

UNITED STATES PATENTS

| | | |
|---|---|---|
| 908,770 | Hartman | Jan. 5, 1909 |
| 1,733,793 | Goss | Oct. 29, 1929 |
| 2,487,851 | Charland | Nov. 15, 1949 |
| 2,522,623 | Likes et al. | Sept. 19, 1950 |
| 2,629,231 | Malek | Feb. 24, 1953 |

FOREIGN PATENTS

| | | |
|---|---|---|
| 720,644 | Germany | May 12, 1942 |